(12) United States Patent
Nomura et al.

(10) Patent No.: US 6,261,385 B1
(45) Date of Patent: Jul. 17, 2001

(54) MAGNETICALLY ANISOTROPIC RARE EARTH-BASED NANOCOMPOSITE PERMANENT MAGNET

(75) Inventors: Tadao Nomura; Ken Ohashi, both of Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/153,893

(22) Filed: Sep. 16, 1998

(30) Foreign Application Priority Data

Sep. 19, 1997 (JP) .................................................. 9-255255

(51) Int. Cl.⁷ .................................................. H01F 1/053
(52) U.S. Cl. ............................................ 148/301; 148/101
(58) Field of Search .................................... 148/301, 302, 148/101, 102, 121; 420/83

(56) References Cited

U.S. PATENT DOCUMENTS

| | | | | |
|---|---|---|---|---|
| 4,921,553 | * | 5/1990 | Tokunga et al. | 148/302 |
| 4,971,637 | * | 11/1990 | Ohashi et al. | 148/301 |
| 5,022,939 | * | 1/1991 | Yajima et al. | 148/302 |
| 5,034,146 | * | 7/1991 | Ohashi et al. | 252/62.57 |
| 5,049,208 | * | 9/1991 | Yajima et al. | 148/302 |
| 5,545,266 | * | 8/1996 | Hirosawa et al. | 148/302 |

* cited by examiner

Primary Examiner—John Sheehan
(74) Attorney, Agent, or Firm—Wenderoth, Lind & Ponack, L.L.P.

(57) ABSTRACT

Disclosed is a novel magnetically anisotropic rare earth-based permanent magnet having a nanocomposite structure consisting of a hard magnetic phase such as $Nd_2Fe_{14}B$ and a soft magnetic phase such as bcc-iron, $Fe_3B$ and $Fe_2B$ in a volume ratio of 10:90 to 90:10 uniformly dispersed each in the other in a fineness of a few tens nanometers, in which particles of the hard magnetic phase are aligned in a direction relative to the easy magnetization axes of the particles. Such an anisotropic permanent magnet can be prepared by the method comprising: preparing a starting amorphous alloy of a composition susceptible to dispersion precipitation of the hard magnetic phase, for example, by the melt-spun method; forming the amorphous alloy into a magnet block; heating the magnet block at 600 to 1000° C. to effect dispersion precipitation of the hard magnetic phase; and deforming the magnet block at the elevated temperature by compression unidirectionally so that the particles of the hard magnetic phase are aligned relative to the easy magnetization axes of the particles.

5 Claims, No Drawings

US 6,261,385 B1

MAGNETICALLY ANISOTROPIC RARE EARTH-BASED NANOCOMPOSITE PERMANENT MAGNET

BACKGROUND OF THE INVENTION

The present invention relates to a magnetically anisotropic rare earth-based permanent magnet having a nanocomposite structure either in the form of a block or in the form of a powder as well as to a method for the preparation thereof.

As is known, several classes of rare earth-based permanent magnets are now under industrial mass production and widely employed as a high-performance permanent magnet including those based on a samarium-cobalt alloy and those based on a neodymium-iron-boron alloy, referred to as Nd/Fe/B magnets hereinafter, as the major current. Of these two classes of the rare earth-based permanent magnets, the demand for the latter class magnets is rapidly growing as compared with the earlier developed former class of the magnets by virtue of their high magnetic properties and economical advantages due to the low material costs as compared with the magnets of the former class.

Several different processes have been developed for the preparation of the Nd/Fe/B magnets, of which the most widely practiced industrial method is the so-called sintering method. The Nd/Fe/B magnets prepared by the sintering method have a composite phase structure consisting of a hard magnetic phase of $Nd_2Fe_{14}B$ in combination with subsidiary phases including, one, a phase rich in the content of neodymium and, the other, a phase rich in the content of boron as $Nd_{1.1}Fe_4B_4$.

This Nd/Fe/B magnet by the sintering method is prepared powder-metallurgically in the following manner as reported by M. Sagawa, et al. in Japanese Journal of Applied Physics, volume 26 (1987), page 785. In the first place, namely, the respective starting materials of neodymium, iron and boron each in an elementary form are taken each in a specified proportion and melted together to form an alloy in such a weight proportion that the contents of neodymium and boron in the resultant Nd/Fe/B alloy are each somewhat higher than the stoichiometric content in $Nd_2Fe_{14}B$ and the thus obtained alloy ingot is pulverized in an atmosphere of an inert gas into a fine powder of which the particle diameter is a few micrometers. The alloy powder is then compression molded into a powder compact or green body in a magnetic field so as to have the easy magnetization axes of the particles aligned in the direction of the magnetic field applied thereto followed by sintering by heating the green body in an inert atmosphere at a temperature of about 1000° C. and an aging treatment at a lower temperature. The Nd/Fe/B magnet thus prepared is magnetically anisotropic by virtue of the cleaning effect on the interface of the principal phase of $Nd_2Fe_{14}B$ by the Nd-rich phase surrounding the principal phase.

On the other hand, a process of so-called melt-spun method as reported by R. W. Lee in Physics Letter, volume 46 (1985), page 790 and elsewhere is known, in which a melt of a Nd/Fe/B alloy having a chemical composition identical to the target composition of the Nd/Fe/B magnet is ejected at the surface of a cold roller rotating at a high revolution to be rapidly solidified into a quenched thin ribbon of the alloy having an amorphous structure which is processed into a Nd/Fe/B magnet. Although the principal phase of the magnet of this type is also $Nd_2Fe_{14}B$, a relatively high coercive force can be obtained therein as a consequence of the small crystallite diameter in the nanometer range from 20 to 100 nm to be about equivalent to the diameter of a single magnetic domain as compared with the magnets prepared by the sintering method.

The Nd/Fe/B magnets prepared by the melt-spun method can be classified into three types. The magnet of the first type is the so-called bond magnet which is prepared by molding a composite blend consisting of fine particles obtained by pulverizing the quenched thin ribbons of the magnetic alloy and a resinous binder. Though advantageous in respect of the simplicity of the preparation process, bond magnets in general have a problem that the magnetic properties thereof cannot be vert high as compared with the magnets of the other types because the magnet is magnetically isotropic without alignment of the easy magnetization axes of the magnet particles as an inherence of the molding process in addition to the relatively low packing density of the magnet particles in the composite blend with the resinous binder. The second type of the Nd/Fe/B magnets prepared by the melt-spun method includes those isotropic bulk magnets obtained by hot-press molding of the fine particles obtained from the quenched thin magnetic ribbons. The Nd/Fe/B magnet of the third type, as disclosed in Japanese Patent Kokai 60-100402 and elsewhere, is obtained by subjecting the second type magnet to hot working so as to accomplish alignment of the easy magnetization axes of the magnetic particles along the direction of compression.

On the other hand, further efforts have been effected for developing high-performance rare earth-based permanent magnets of the next generation resulting in the debut of the now highlighted so-called nanocomposite magnets reported in IEEE Transaction Magnetics, volume 27 (1991), page 3588 by E. F. Kneller, et al. and elsewhere.

Each of the above described Nd/Fe/B magnets prepared by the sintering method and melt-spun method contains a hard magnetic phase of $Nd_2Fe_{14}B$ as the principal phase but is free from any soft magnetic phases with an increased content of iron such as the phases of bcc-iron (body-centered-cubic iron), $Fe_3B$, $Fe_2B$ and the like.

In contrast thereto, the newly developed nanocomposite magnets have a composite structure consisting of a hard magnetic phase and a soft magnetic phase finely and uniformly dispersed each in the other in a fineness order of several tens of nanometers. In such a nanocomposite structure of the magnet, it is understood that coupling is established between magnetization of the hard magnetic phase and magnetization of the soft magnetic phase by the exchange interaction so that reversal in the magnetization of the soft magnetic phase is inhibited resulting in a behavior of the magnet structure as a whole something like a single hard magnetic phase. The applicability of the above described principle of the nanocomposite magnet is not limited to newly developed magnetic materials but there is a possibility that even a conventional magnetic material can be processed into a nanocomposite magnet having a still higher saturation magnetization without causing a decrease in the coercive force. For example, it is reported by R. Skomeski, et al. in Physical Review, volume B 48 (1993), page 15812 that their theoretical calculation indicates that a samariumbased permanent magnet having a composite composition of the formula $Sm_2Fe_{17}N_3/(Fe,Co)$ and imparted with magnetic anisotropy may have a maximum energy product $(BH)_{max}$ of as high as 137 MGOe when the magnet has a nanocomposite structure.

Besides the above described theoretical studies, experimental results are reported for rare earth-based permanent magnets of the nanocomposite structure with several different combinations of the hard and soft magnetic phases including $Nd_2Fe_{14}B/Fe_3B$ disclosed by R. Coehoorn, et al. in Journal de Physique, volume 49 (1988), page C8-669, $Nd_2Fe_{14}B/Fe$ disclosed in Japanese Patent Kokai 7-173501 and 7-176417, Journal of Applied Physics, volume 76 (1994), page 7065 by L. Withanawasam, et al. and elsewhere, and $Sm_2Fe_{17}N_3/Fe$ disclosed In Journal of Magnetism and Magnetic Materials, volume 124 (1993), page L1 by J. Ding, et al.

In each of these recently developed methods for accomplishing a finely dispersed structure of a rare earth-based permanent magnet, microcrystallites are formed by undertaking a heat treatment of the quenched thin ribbons obtained by the melt-spun method or particles of an amorphous alloy prepared by the mechanical alloying method. Accordingly, like the first type method mentioned above, the particles of the alloy cannot be magnetically aligned relative to the crystallographic orientation so that the permanent magnets obtained by these methods as such are necessarily limited to magnetically isotropic ones. Thus, no prior art is known on the process for the preparation of a magnetically anisotropic rare earth-based nanocomposite permanent magnet notwithstanding the theoretical studies suggesting possibility of obtaining such a high-performance permanent magnet.

SUMMARY OF THE INVENTION

The present invention accordingly has an object, in view of the above described situations of the prior art, to provide a magnetically anisotropic rare earth-based permanent magnet having a so-called nanocomposite structure consisting of a hard magnetic phase and a soft magnetic phase finely and uniformly dispersed each in the other, of which the fine particles of the hard magnetic phase are aligned in a direction relative to the easy magnetization axes of the particles as well as to provide a method for the preparation of such a rare earth-based magnetically anisotropic nanocomposite permanent magnet.

The method of the present invention has been completed on the base of an unexpected discovery that the above mentioned magnetically anisotropic nanocomposite structure of a rare earth-based permanent magnet can be obtained by undertaking a hot forming treatment of a magnetic alloy in the form of a quenched thin ribbon having such a chemical composition as to be susceptible to fine dispersion precipitation of a hard magnetic phase and a soft magnetic phase by a heat treatment.

Thus, the magnetically anisotropic rare earth-based permanent magnet provided by the present invention has a nanocomposite structure consisting of a hard magnetic phase and a soft magnetic phase each having a specified chemical composition finely and uniformly dispersed each in the other in a nanometer order fineness, of which the particles of the hard magnetic phase are aligned relative to the easy magnetization axes of the particles and the volume ratio of the hard magnetic phase and the soft magnetic phase is in the range from 10:90 to 90:10

The above mentioned specified chemical composition of the hard magnetic phase is selected from the group consisting of $Nd_2Fe_{14}B$, $Nd_2(Fe,Co)_{14}B$, $Sm_2Co_{17}$, $Sm_2(Fe,Co)_{17}$, $Sm(Fe,M^1)_{12}$, $Sm(Fe,Co,M^1)_{12}$, $Sm_2Fe_{17}$ nitride, $Sm_2(Fe,Co)_{17}$ nitride, $(Nd,M^2)Fe_x$ nitride and $(Nd,M^2)(Fe,Co)_x$ nitride, in which $M^1$ is an element selected from the group consisting of titanium, vanadium, chromium, molybdenum, silicon and copper, $M^2$ is an element selected from the group consisting of titanium, vanadium, zirconium, niobium, hafnium, tantalum, silicon and aluminum and the subscript x is a number in the range from 5 to 12.

On the other hand, the soft magnetic phase of the specified chemical composition is selected from the group consisting of bcc-iron, cobalt, $Fe_3B$, $Fe_2B$, Fe—Co alloys, $(Fe,Co)_3B$, $(Fe,Co)_2B$, Fe—$M^1$ alloys, Fe—$M^1$ intermetallic compounds, Fe—Co—$M^1$ alloys, Fe—Co—$M^1$ intermetallic compounds, Fe—$M^2$ alloys, Fe—$M^2$ intermetallic compounds, Fe—Co—$M^2$ alloys and Fe—Co—$M^2$ intermetallic compounds, in which $M^1$ and $M^2$ each have the same definition as given above.

The method of the present invention for the preparation of a magnetically anisotropic rare earth-based permanent magnet having a nanocomposite structure consisting of a hard magnetic phase and a soft magnetic phase uniformly and finely dispersed each in the other, of which the particles of the hard magnetic phase are aligned relative to the easy magnetization axes of the particles, comprises the step of: subjecting a rare earth-based alloy material in the form of a quenched thin ribbon having an amorphous structure to compressive deformation in one direction at an elevated temperature, the amorphous quenched thin ribbon having a chemical composition which is an average weighted for the above specified hard and soft magnetic phases relative to the volume ratio thereof which is in the range from 10:90 to 90:10.

DETAILED DESCRIPTION OF THE PREFERRED EMBODIMENTS

As is described above, the magnetically anisotropic rare earth based permanent magnet of the invention has a nanocomposite structure consisting of a magnetically hard and soft phases dispersed uniformly and finely each in the other. The volume fraction of the hard magnetic phase can be in the range from 10% to 90%, the balance of the volume being the soft magnetic phase.

The chemical composition of the hard magnetic phase can be selected from the alloy compositions of the formulas including $Nd_2Fe_{14}B$, $Nd_2(Fe,Co)_{14}B$, $Sm_2Co_{17}$, $Sm_2(Fe,Co)_{17}$, $Sm(Fe,M^1)_{12}$, $Sm(Fe,Co,M^1)_{12}$, $Sm_2Fe_7$ nitride, $Sm_2(Fe,Co)_{17}$ nitride, $(Nd,M^5)Fe_x$ nitride and $(Nd,M^2)(Fe,Co)_x$ nitride, in which $M^1$ is an element selected from the group consisting of titanium, vanadium, chromium, molybdenum, silicon and copper, $M^2$ is an element selected from the group consisting of titanium, vanadium, zirconium, niobium, hafnium, tantalum, silicon and aluminum and the subscript x is a number in the range from 5 to 12.

On the other hand, the soft magnetic phase has a chemical composition exemplified by bcc-iron (body-centered-cubic iron), cobalt, $Fe_3B$, $Fe_2B$, iron-cobalt alloys, $(Fe,Co)_3B$, $(Fe,Co)_2B$, iron-$M^1$ alloys, iron-$M^1$ intermetallic compounds, iron-cobalt-$M^1$ alloys, iron-cobalt-$M^1$ intermetallic compounds, iron-$M^2$ alloys, iron-$M^2$ intermetallic compounds, iron-cobalt-$M^2$ alloys and iron-cobalt-$M^2$ intermetallic compounds, in which $M^1$ and $M^2$ each have the same meaning as defined for the hard magnetic phase.

Preferable combinations of the magnetically hard and soft phases are as follows:

$Nd_2Fe_{14}B$/bcc-iron, $Fe_3B$ or $Fe_2B$;

$Nd_2(Fe,Co)_{14}B$/Fe-Co alloy, $(Fe,Co)_3B$ or $(Fe,Co)_2B$;

$Sm_2Co_{17}$ or $(Sm_2(Fe,Co)_{17}$/cobalt or Fe—Co alloy;

$Sm(Fe,M^1)_{12}$ or $Sm(Fe,Co,M^1)_{12}$/bcc-iron, Fe—Co alloy or intermetallic compound or Fe—Co—$M^1$ alloy or intermetallic compound;

$Sm_2Fe_{17}$ nitride or $Sm_2(Fe,Co)_{17}$ nitride/bcc-iron or Fe—Co alloy; and $(Nd,M^2)Fe_x$ nitride or $(Nd,M^2(Fe,Co)_x$ nitride/bcc-iron, Fe—$M^2$ alloy or intermetallic compound, Fe—Co alloy or Fe—Co—$M^2$ alloy or intermetallic compound.

The volume ratio of the magnetically hard and soft phases in the inventive nanocomposite magnet should be in the range from 10:90 to 90:10. When the volume fraction of the soft magnetic phase is too small, the permanent magnet cannot be imparted with a fully improved saturation magnetization. When the volume fraction of the soft magnetic phase is too large, on the other hand, the coercive force of the nanocomposite magnet cannot be high enough due to the deficiency in the content of the hard magnetic phase.

Firstly in the preparation of the magnetically anisotropic rare earth-based nanocomposite permanent magnet of the present invention, an alloy melt is prepared from the alloying elements in such a proportion as to give a specified chemical composition to be susceptible to fine dispersion precipitation by a heat treatment or, in particular, a chemical composition which is an average of the compositions of the magnetically hard and soft phases weighted relative to the respective target volume ratio of the hard and soft magnetic phases which should be in the range from 10:90 to 90:10.

To give an example for a particular combination of the magnetically hard and soft phases consisting of $Nd_2Fe_{14}B$ as the hard magnetic phase and bcc-iron as the soft magnetic phase, the starting alloy should preferably have a composition in which the molar fractions of neodymium and boron are from 2 to 10% and from 1 to 8%, respectively, the balance being iron. When $Nd_2Fe_{14}B$ and $Fe_3B$ are the magnetically hard and soft phases, respectively, the starting alloy should preferably have a composition in which the molar fractions of neodymium and boron are from 2 to 10% and from 15 to 25%, respectively, the balance being iron. Further, when $Nd_2Fe_{14}B$ and $Fe_2B$ are the magnetically hard and soft phases, respectively, the starting alloy should preferably have a composition in which the molar fractions of neodymium and boron are from 2 to 10% and from 25 to 35%, respectively, the balance being iron. It is of course a possible case that two or three phases including the bcc-iron, $Fe_3B$ and $Fe_2B$ jointly constitute the soft magnetic phase when the starting alloy has an intermediate composition.

The description given above for the systems of neodymium, iron and boron is also applicable to the systems obtained by replacing a part of iron with cobalt to make combinations of $Nd_2(Fe,Co)_{14}B$/iron-cobalt alloy, $Nd_2(Fe,Co)_{14}B/(Fe,Co)_3B$ and $Nd_2(Fe,Co)_{14}B/(Fe,Co)_2B$ for the magnetically hard and soft phases.

It is optional and advantageous with an object to further improve the magnetic properties of the inventive permanent magnet to replace a small portion of the iron constituent in the starting alloy with one or more of additive elements selected from the group consisting of aluminum, silicon, titanium, vanadium, chromium, manganese, nickel, copper, zinc, gallium, germanium, zirconium, niobium, molybdenum, technetium, ruthenium, rhodium, palladium, silver, cadmium, indium, tin, hafnium, tantalum, tungsten, rhenium, osmium, iridium, platinum, gold, thallium, lead and bismuth. The amount of these additive elements, when added to replace a part of iron, in the starting alloy should not exceed 5% by moles. When the amount of these additive elements is too large, a decrease is caused in the saturation magnetization of the nanocomposite permanent magnet. It is further optional that a part of the neodymium in the starting alloy is replaced with other rare earth elements such as praseodymium, terbium, dysprosium, holmium and the like so that an improvement can be obtained in the coercive force of the resultant permanent magnet.

When $Sm_2Co_{17}$ and cobalt constitute the magnetically hard and soft phases, respectively, the starting alloy should preferably have a composition in which the molar fraction of samarium is from 2 to 10%, the balance being cobalt. It is of course optional that a part of the cobalt is replaced with iron so as to make a combination of $Sm_2$ $(Fe,Co)_{17}$ and an iron-cobalt alloy as the magnetically hard and soft phases, respectively, or with one or more of the above named additive elements. If desired, a part of samarium is replaced with cerium or other light rare earth elements which can be introduced in the form of a misch metal.

Partial replacement of iron in $SmFe_{12}$ with a substitute element denoted by $M^1$ to make up a combination of $Sm(Fe,M^1)_{12}$ and bcc-iron as the magnetically hard and soft phases, respectively, has an effect of increasing the stability of the so-called 1–12 crystalline structure. The optimum degree of substitution of the element $M^1$ depends on the kind of the element $M^1$. When titanium is taken as the element $M^1$, for example, good stability of the hard magnetic phase can be obtained with a composition of $SmFe_{11}Ti$. When the element $M^1$ is vanadium, chromium, molybdenum or silicon, on the other hand, best stability can be obtained with a composition of $SmFe_{10}M^2$. Thus, it is important that the amount of the substitute element $M^1$ in the starting alloy is selected depending on the element. The soft magnetic phase in the above mentioned combination can be, besides the bcc-iron, an iron-$M^1$ alloy or an iron-$M^1$ intermetallic compound. In addition, a part of iron in the above mentioned systems can be replaced, besides the substitute element $M^1$, with cobalt to make up a combination of $Sm(Fe,Co,M^1)_{12}$/iron-cobalt alloy, $Sm(Fe,Co,M^1),12$ iron-cobalt-$M^1$ alloy or $Sm(Fe,Co,M^1)_{12}$/iron-cobalt-$M^1$ intermetallic compound. It is of course optional that one or more of the additive elements selected from the group consisting of aluminum, manganese, nickel, copper, zinc, gallium, germanium, zirconium, niobium, technetium, ruthenium, rhodium, palladium, silver, cadmium, indium, tin, hafnium, tantalum, tungsten, rhenium, osmium, iridium, platinum, gold, thallium, lead and bismuth are introduced. A part of samarium can be replaced with other rare earth elements.

When a $Sm_2Fe_7$ nitride and bcc-iron constitute the magnetically hard and soft phases, respectively, the starting alloy should preferably have a composition in which the molar fraction of samarium is in the range from 2 to 10%, the balance being iron. The hard magnetic phase can be converted into a nitride in the course of the heat treatment subsequently undertaken in a nitrogen-containing atmosphere. It is optional also in this case that a part of iron is replaced with cobalt and/or one or more of the above named substitute and additive elements or a part of samarium is replaced with other rare earth elements.

When the hard magnetic phase is a $(Nd,M^2)Fe_x$ nitride or $(Nd,M^2)(Fe,Co)_x$ nitride, the $(Nd,M^2)Fe_x$ compound as the precursor of the nitride phase is not limited to those having the same crystalline structure as in the binary stable system such as $NdFe_2$, $Nd_2Fe_{17}$ and the like but can be one of many multi-component stable compounds and metastable phases such as the 1–7 phase and 1–12 phase so that the nitride thereof is also widely varied correspondingly. The subscript x in the formulas expressing the hard magnetic phase is a number preferably in the range from 5 to 12 because, when x is smaller than 5, the compound of the formula cannot be ferromagnetic at room temperature but, when x is larger than 12, the nitride permanent magnet cannot be imparted with full magnetic anisotropy. The soft magnetic phase is also not limited to bcc-iron but can be an iron-$M^2$ alloy or iron-$M^2$ intermetallic compound as well as a combination thereof. It is further optional to replace a part of the iron with cobalt so as to make up a combination of $(Nd,M^2)(Fe,Co)_x$ nitride/iron-cobalt alloy or $(Nd,M^2)(Fe,Co)_x$ nitride/iron-cobalt intermetallic compound or with the above enumerated additive elements. A part of neodymium can of course be replaced with other rare earth elements.

Examples of the combination of the magnetically hard and soft phases of this type include, though not particularly limitative thereto, $(Nd,Zr)Fe_7$ nitride/bcc-iron, $(Nd,Zr)Fe_7$ nitride/(Fe,Zr), $(Nd,Zr)Fe_7$ nitride/ $Fe_3Zr$, $(Nd,Zr)(Fe,Co)_7$ nitride/(Fe,Co), $(Nd,Zr)Fe_9$ nitride/bcc-iron, $(Nd,Zr)(Fe,Co)_9$ nitride/(Fe,Co), $(Nd,Zr)Fe_{10}$ nitride/bcc-iron, $(Nd,Zr)(Fe,Co)_{10}$ nitride/(Fe,Co), $(Nd,Zr)Fe_{12}$ nitride/bcc-iron, $(Nd,Zr)(Fe,Co)_{12}$ nitride/(Fe,Co), $(Nd,Nb)Fe_7$ nitride/bcc-iron, $(Nd,Nb)(Fe,Co)_7$ nitride/(Fe,Co), $(Nd,Nb)Fe_{12}$ nitride/bcc-iron, $(Nd,Nb)$ $(Fe,Co)_{12}$ nitride/(Fe,Co), $(Nd,Hf,Fe_7$ nitride/bcc-iron, $(Nd,Hf(Fe,Co)_7$ nitride/(Fe,Co), $(Nd,Hf)Fe_{12}$ nitride/bcc-iron, $(Nd,Hf)(Fe,Co)_{12}$ nitride/(Fe,Co) and the like.

The above described starting alloy composition is heated in an inert atmosphere to form a melt of the alloy which is then subjected to the melt-spun method to give a quenched alloy having an amorphous structure or a combination of an amorphous structure with fine crystallites dispersed therein. Quenching of the molten alloy is conducted by a known method including rotating roller method, splat method, gas atomizing method and others, of which the rotating roller method is preferred because the method is relatively simple and convenient and the solidified alloy is obtained in the form of a quenched thin ribbon having good quality. In conducting the rotating roller method using a copper roller, the molten alloy is ejected at the surface of a cold roller rotating at a peripheral velocity in the range from 10 meters to 50 meters per second. When the rotating velocity of the quenching roller is too low, the solidified alloy cannot be in a good amorphous state while, when the rotating velocity is too high, a difficulty is encountered in accomplishing dispersion precipitation of the magnetically hard and soft phases in a crystalline state in the subsequent heat treatment.

The amorphous alloy obtained in the above described manner is pulverized and then subjected to compressive deformation at an elevated temperature in the range from 600 to 1000° C. Several methods are known for the compressive deformation of the alloy powder including the method disclosed in Japanese Patent Kokai 60-100402 in which the powder is shaped in a hot press into a block which is subjected to hot forming, the extrusion working method reported in Journal of Japan Applied Magnetics Society, volume 12 (1988), page 219, the pack rolling method reported in Journal of Japan Applied Magnetics Society, volume 16 (1992), page 147, the method utilizing an impact pressure disclosed in Japanese Patent Publication 7-87156 and so on. While each of these prior art methods was proposed relative to the preparation of magnetically anisotropic Nd/Fe/B permanent magnets and is employed heretofore in the preparation of Nd/Fe/B magnets of which the content of neodymium is higher than the stoichiometric content thereof corresponding to the formula $Nd_2Fe_{14}B$, it is characteristic in the present invention that the method is applied to an alloy composition of which the content of the rare earth element is lower than in the stoichiometric composition of the hard magnetic phase generated from the alloy composition in combination with a soft magnetic phase such as bcc-iron, iron-cobalt alloys and the like in a volume fraction in the range from 10% to 90%, the soft magnetic phase being in magnetic exchange coupling with the hard magnetic phase.

Needless to say, the bulk magnet prepared in the above described manner can be pulverized into a fine powder consisting of particles of a magnetically anisotropic nanocomposite rare earth-based magnet, from which a high-performance bond magnet can be prepared by molding a composition comprising the magnet particles and a resinous binder.

In the following, the rare earth-based magnetically anisotropic nanocomposite permanent magnets and the method for the preparation thereof are illustrated in more detail by way of Examples, which, however, never limit the scope of the invention in any way.

EXAMPLE 1

A starting alloy having a chemical composition corresponding to the formula $Nd_9Fe_{76}B_{15}$ was prepared by taking neodymium, iron and boron each in the metallic or elementary form in a proportion corresponding to the above mentioned alloy composition and melting them together in an arc melting furnace under an atmosphere of argon. The alloy taken in an ejector nozzle of fused silica glass was melted by high-frequency induction heating under an atmosphere of argon and the melt was ejected from the nozzle at the surface of a cold copper roller rotating at a peripheral velocity of 45 meters per second to prepare quenched thin ribbons of the alloy having an amorphous structure.

The quenched thin ribbons obtained in this manner were pulverized into a fine powder which was molded by hot-pressing in an atmosphere of argon into a block followed by a compressive hot forming treatment at 850° C. also in an atmosphere of argon to obtain a magnetically anisotropic nanocomposite permanent magnet consisting of 60% by volume of the soft magnetic phase and 40% by volume of the hard magnetic phase as estimated from the results of the examination of the internal structure by means of transmission electron microscopic and scanning electron microscopic photographs.

The magnetic anisotropy of the thus prepared permanent magnet was estimated by the following tests. Thus, a cubic test specimen was taken from the magnet block by cutting and the magnetization of the cube sample under application of a magnetic field of 20 kOe was measured in the direction of compression during the hot forming treatment and in the direction perpendicular to the direction of compression to obtain values of $I_{p1}$ and $I_{a1}$, respectively, from which the ratio of $I_{a1}:I_{p1}$ was calculated and recorded. A smaller value of this ratio means a larger magnetic anisotropy of the permanent magnet.

Separately, the above obtained magnetically anisotropic magnet block was pulverized in a ball mill and the powder was uniformly compounded with molten paraffin and consolidated therein by cooling under application of a magnetic field of 14 kOe to give a paraffin-bonded magnet block, of which the magnetization under application of a magnetic field of 20 kOe was measured in the directions parallel to and perpendicular to the direction of the magnetic field during solidification of the molten paraffin to obtain values of $I_{p2}$ and $I_{a2}$, respectively, from which the ratio of $I_{a2}:I_{p2}$ was calculated and recorded.

Table 1 below gives the values of the ratios $I_{a1}:I_{p1}$ and $I_{a2}:I_{p2}$ as well as the temperature in the hot forming treatment and the volume fraction of the soft magnetic phase in %.

EXAMPLES 2 TO 12

In each of these Examples, quenched thin ribbons having a chemical composition indicated below were prepared by the melt-spun method in the same manner as in Example 1.

Example 2: $Nd_4Fe_{78}B_{18}$

Example 3: $Nd_9Fe_{86}B_5$

Example 4: $Nd_8Fe_{87}B_5$

Example 5: $Nd_8Fe_{77}Co_{10}B_4$

Example 6: $Nd_5Fe_{82}Co_{10}B_3$

Example 7: $Sm_6Co_{94}$

Example 8: $Sm_7Fe_{13}Co_{80}$

Example 9: $Sm_4Fe_{92}Ti_4$

Example 10: $Sm_5Fe_{80}Co_{10}Ti_5$

Example 11: $Sm_5Fe_{85}Mo_{10}$

Example 12: $Sm_4Fe_{87}Si_5Cu_3$

The quenched thin ribbons of each of these alloys were pulverized and a copper capsule was filled with the alloy powder which was subjected to a heat treatment at the hot forming temperature indicated in Table 1 under an atmosphere of argon followed by compression in a press to give a magnetically anisotropic nanocomposite permanent magnet.

Table 1 below summarizes the hot forming temperature and the values of the ratios $I_{a1}:I_{p1}$ and $I_{a2}:I_{p2}$ determined in the same manner as in Example 1 as well as the volume fraction of the soft magnetic phase in % as estimated electron microscopically.

EXAMPLES 13 TO 16

The experimental procedure in each of these Examples was substantially the same as in Examples 2 to 12 described above except that the quenched thin ribbons of the starting alloy prepared by the melt-spun method had a chemical composition corresponding to the formula indicated below and the heat treatment in the hot forming was undertaken in an atmosphere containing nitrogen gas so as to effect nitriding of the hard magnetic phase into a nitride.

Example 13: $Sm_6Fe_{94}$

Example 14: $Sm_4Fe_{80}Co_{16}$

Example 15: $Nd_7Zr_4Fe_{89}$

Example 16: $Nd_5Zr_3Fe_{87}CO_5$

Table 1 below summarizes the hot forming temperature and the values of the ratios $I_{a1}:I_{p1}$ and $I_{a2}:I_{p2}$ determined in the same manner as in Example 1 as well as the volume fraction of the soft magnetic phase in % as estimated electron microscopically

COMPARATIVE EXAMPLE

The experimental procedure was substantially the same as in Examples 2 to 12 described above except that the alloy powder obtained by pulverizing quenched thin ribbons of a starting alloy having a chemical composition corresponding to the formula $Nd_9Fe_{86}B_5$ was subjected as such to a heat treatment at 850° C. under an atmosphere of argon without undertaking the compressive forming in a press.

The thus heat-treated alloy powder was subjected to the measurement of the magnetization in a paraffin-bonded magnet block in the same manner as in Example 1 to obtain the ratio of $I_{a2}:I_{p2}$ which was 0.98 indicating substantial absence of magnetic anisotropy. The volume fraction of the soft magnetic phase was 18%.

TABLE 1

| Example No. | Hot forming temperature, °C. | Soft magnetic phase, % by volume | $I_{a1}:I_{p1}$ | $I_{a2}:I_{p2}$ |
|---|---|---|---|---|
| 1 | 850 | 60 | 0.85 | 0.83 |
| 2 | 750 | 85 | 0.88 | 0.88 |
| 3 | 900 | 18 | 0.58 | 0.55 |
| 4 | 700 | 22 | 0.52 | 0.49 |
| 5 | 800 | 24 | 0.45 | 0.44 |
| 6 | 750 | 50 | 0.35 | 0.34 |
| 7 | 1000 | 31 | 0.50 | 0.49 |
| 8 | 1000 | 25 | 0.55 | 0.56 |
| 9 | 900 | 42 | 0.51 | 0.49 |
| 10 | 900 | 30 | 0.76 | 0.76 |
| 11 | 900 | 11 | 0.88 | 0.85 |
| 12 | 850 | 25 | 0.77 | 0.75 |
| 13 | 600 | 53 | 0.81 | 0.82 |
| 14 | 600 | 50 | 0.84 | 0.84 |
| 15 | 600 | 21 | 0.93 | 0.91 |
| 16 | 600 | 29 | 0.88 | 0.86 |

What is claimed is:

1. A magnetically anisotropic rare earth-based permanent magnet having a nanocomposite structure consisting of a hard magnetic phase and a soft magnetic phase finely and uniformly dispersed each in the other in a volume ratio in the range from 10:90 to 90:10, particles of the hard magnetic phase being aligned in a direction relative to the easy magnetization axes of the particles, wherein the hard magnetic phase has a chemical composition of the formula $Sm_2Co_{17}$ or $Sm_2(Fe,Co)_{17}$ and the soft magnetic phase is cobalt or a Fe—Co alloy.

2. A magnetically anisotropic rare earth-based permanent magnet having a nanocomposite structure consisting of a hard magnetic phase and a soft magnetic phase finely and uniformly dispersed each in the other in a volume ratio in the range from 10:90 to 90:10, particles of the hard magnetic phase being aligned in a direction relative to the easy magnetization axes of the particles, wherein the hard magnetic phase has a chemical composition of the formula $Sm(Fe,M^1)_{12}$ or $Sm(Fe,Co,M^1)_{12}$ and the soft magnetic phase is selected from the group consisting of bcc-iron, Fe—Co alloys, Fe—$M^1$ alloys, Fe—$M^1$ intermetallic compounds, Fe—Co—$M^1$ alloys and Fe—Co—$M^1$ intermetallic compounds, in which $M^1$ is an element selected from the group consisting of titanium, vanadium, chromium, molybdenum, silicon and copper.

3. A magnetically anisotropic rare earth-based permanent magnet having a nanocomposite structure consisting of a hard magnetic phase and a soft magnetic phase finely and uniformly dispersed each in the other in a volume ratio in the range from 10:90 to 90:10, particles of the hard magnetic phase being aligned in a direction relative to the easy magnetization axes of the particles, wherein the hard magnetic phase is a $Sm_2Fe_{17}$ nitride or $Sm_2(Fe,Co)_{17}$ nitride and the soft magnetic phase is bcc-iron or a Fe—Co alloy.

4. A magnetically anisotropic rare earth-based permanent magnet having a nanocomposite structure consisting of a hard magnetic phase and a soft magnetic phase finely and uniformly dispersed each in the other in a volume ratio in the range from 10:90 to 90:10, particles of the hard magnetic phase being aligned in a direction relative to the easy magnetization axes of the particles, wherein the hard magnetic phase is a $(Nd,M^2)Fe_x$ nitride or a $(Nd,M^2)(Fe,Co)_x$ nitride and the soft magnetic phase is selected from the group consisting of bcc-iron, Fe—$M^2$ alloys, Fe—$M^2$ intermetallic compounds, Fe—Co alloys, Fe—Co—$M^2$ alloys and Fe—Co—$M^2$ intermetallic compounds, in which $M^2$ is an element selected from the group consisting of titanium, vanadium, zirconium, molybdenum, hafnium, tantalum, silicon and aluminum and the subscript x is a number in the range from 5 to 12.

5. A method for the preparation of a magnetically anisotropic rare earth-based permanent magnet having a nanocomposite structure consisting of a hard magnetic phase and a soft magnetic phase in a volume ratio in the range from 10:90 to 90:10 finely and uniformly dispersed each in the other, particles of the hard magnetic phase being aligned in a direction relative to the easy magnetization axes of the particles, which comprises the steps of:

(a) preparing a starting amorphous alloy in the form of a quenched thin ribbon by the melt-spun method, the amorphous alloy having a chemical composition which is an average of the composition of the hard magnetic phase and the composition of the soft magnetic phase weighted relative to the volume ratio of the respective phases in the range from 10:90 to 90:10;

(b) forming the starting amorphous alloy into the form of a magnet block;

(c) heating the magnet block at a temperature in the range from 600 to 1000° C.; and (d) deforming the magnet block compressively at a temperature in the range from 600 to 1000° C. along a direction, the hard magnetic phase having a chemical composition selected from the group consisting of $Nd_2Fe_{14}B$, $Nd_2(Fe,Co)_{14}B$, $Sm_2Co_{17}$, $Sm_2(Fe,Co)_{17}$, $Sm(Fe,M^1)_{12}$, $Sm(Fe,Co,M^1)_{12}$, $Sm_2Fe_{17}$ nitride, $Sm_2(Fe,Co)_{17}$ nitride, $(Nd,M^2)Fe_x$ nitride and $(Nd,M^2)(Fe,Co)_x$ nitride, in which $M^1$ is an element selected from the group consisting of titanium, vanadium, chromium, molybdenum, silicon and copper and $M^2$ is an element selected from the group consisting of titanium, vanadium, zirconium, molybdenum, hafnium, tantalum, silicon and aluminum, and the soft magnetic phase being selected from the group consisting of bcc-iron, cobalt, $Fe_3B$, $Fe_2B$, Fe—Co alloys, $(Fe,Co)_3B$, $(Fe,Co)_2B$, Fe—$M^1$ alloys, Fe—$M^1$ intermetallic compounds, Fe—Co—$M^1$ alloys, Fe—Co—$M^1$ intermetallic compounds, Fe—$M^2$ alloys, Fe—$M^2$ intermetallic compounds, Fe—Co—$M^2$ alloys and Fe—Co—$M^2$ intermetallic compounds, in which $M^1$ and $M^2$ each have the same definition as given above and the subscript x is a number in the range from 5 to 12.

* * * * *